United States Patent
Wang et al.

(10) Patent No.: US 8,792,822 B2
(45) Date of Patent: Jul. 29, 2014

(54) POWER MANAGEMENT SCHEME FOR PROTECTING COMPONENTS ON BOARD A SPACECRAFT

(75) Inventors: Weizheng W. Wang, Rancho Palos Verdes, CA (US); Bruce A. Tomei, Long Beach, CA (US); Stephen F. Sichi, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 903 days.

(21) Appl. No.: 12/961,712

(22) Filed: Dec. 7, 2010

(65) Prior Publication Data

US 2012/0139780 A1    Jun. 7, 2012

(51) Int. Cl.
*H04B 7/185*      (2006.01)

(52) U.S. Cl.
USPC .......... 455/13.4; 455/12.1; 455/427; 370/316

(58) Field of Classification Search
CPC .. H04B 7/185; H04B 7/1851; H04B 7/18513; H04B 7/18515
USPC ................. 455/12.1–13.4, 427–430
See application file for complete search history.

(56) References Cited

U.S. PATENT DOCUMENTS

| | | | |
|---|---|---|---|
| 4,901,085 A | 2/1990 | Spring et al. | |
| 4,907,004 A | 3/1990 | Zacharatos et al. | |
| 5,589,834 A | 12/1996 | Weinberg | |
| 6,141,534 A * | 10/2000 | Snell et al. | 455/12.1 |
| 7,728,766 B2 | 6/2010 | Draganov et al. | |
| 2004/0224633 A1 | 11/2004 | Coromina | |

FOREIGN PATENT DOCUMENTS

| | | |
|---|---|---|
| EP | 0805568 A1 | 11/1997 |
| WO | WO 99/18678 A1 | 4/1999 |
| WO | WO 00/14898 A2 | 3/2000 |

OTHER PUBLICATIONS

European Patent Office, Search Report dated May 16, 2013.

* cited by examiner

*Primary Examiner* — Raymond Dean
(74) *Attorney, Agent, or Firm* — Charles L. Moore; Moore & Van Allen PLLC (57) ABSTRACT

A system for protecting a power unit on a spacecraft may include a ground station. The ground station may include a power unit loading estimation and monitoring module for estimating a power loading level on a power unit of the spacecraft power unit. The ground station may also include a ground station power limiter to regulate a power of a signal for transmission from the ground station to the spacecraft to prevent overloading the spacecraft power unit. The power of the signal for transmission to the spacecraft may be regulated based at least in part on an estimated power loading level on the power unit of the spacecraft.

20 Claims, 4 Drawing Sheets

POWER MANAGEMENT SCHEME FOR PROTECTING COMPONENTS ON BOARD A SPACECRAFT

FIELD

The present disclosure relates to spacecraft and communications via a spacecraft or satellite, and more particularly to a method and system for power management for protecting components on board a spacecraft.

BACKGROUND

Radio frequency (RF) high power communications units in a satellite communications system typically have maximum power limits. If the maximum power limit is exceeded, the power unit may be damaged. The maximum power limit can be divided into an instantaneous power limit and a specific time window average power limit. Typically, a power unit has a different limit to instantaneous power level and to average power levels. The power unit loading typically varies with traffic loading in the system. Accordingly, the more traffic or communications signals being carried by the satellite or spacecraft, the higher the signal power being carried or transmitted through the power units of the satellite. The power unit overload problems are a major concern to a satellite communications system, especially to a ground beam forming communications systems. Current industry practice is to provide a substantial power margin to the power units with no active power management in the system, especially for the average power limit. However, if a power unit is overloaded, the unit may be damaged. There are some existing protection schemes available in practice, which use hardware limitation (such as amplifiers) to limit certain unit output power. However, these schemes typically can only limit the instantaneous maximum power. Such schemes are not useable with any beam forming techniques or in a beam forming environment.

SUMMARY

In accordance with an embodiment, a power management system and method to protect components on a spacecraft, such as communications power units that may operate at a high power. The system may include power regulators or limiters to limit an average power of the communications signals carried or transmitted by the power units on board the spacecraft. A predictive model or models may be used to estimate the power loading on the power units of the spacecraft. An action may be automatically taken to reduce the power loading in response to the estimated or predicted power loading exceeding a predetermined power limit or capacity of the power unit of the spacecraft. The predictive model may be formed at the satellite system beginning of life (BOL) based on available system integration test data. The predictive model may be refined based on satellite in-orbit-test (IOT) test data. The predictive model may be updated during the normal operation based on power measurement data from predetermined power measurement locations in the spacecraft communications system. The predicted or estimated power loading on the power units may be compared or matched to the spacecraft telemetry data or measured power data. Based on the predictive model, the ground traffic loading may be dynamically allocated to distribute the power between the power units of the spacecraft so as to not overload any one power unit. With the various limiters set to their respective predetermined limits, the system should substantially protect the power units from overload or the signal power being carried or transmitted by the power units exceeding their capacity resulting in possible damage under normal operating condition. To prevent the power units of the spacecraft from damage under abnormal operating conditions, the power management system may include multiple regulatory points and multiple monitoring points. At a regulatory point, the power levels are controlled to ensure the power units of the spacecraft are not overdriven. The power level may be controlled by power limiters or regulators. From a monitoring perspective, whenever an estimated power is over a fault limit or preset limit, the system may command or automatically perform a reduction in power. Ground traffic loading points may provide feedback and update to the system.

In accordance with an embodiment, a system for protecting a power unit on a spacecraft may include a ground station. The ground station may include a power unit loading estimation and monitoring module for estimating a power loading level on a power unit of the spacecraft power unit. The ground station may also include a ground station power limiter to regulate a power of a signal for transmission from the ground station to the spacecraft to prevent overloading the spacecraft power unit. The power of the signal for transmission to the spacecraft may be regulated based at least in part on an estimated power loading level on the power unit of the spacecraft.

In accordance with another embodiment, a spacecraft may include a forward link process module to allocate signals received from a ground station transmitter to different power amplifiers on board the spacecraft. The spacecraft may also include a power unit for selected functions before transmitting signals to ground users. A spacecraft power limiter on board the spacecraft may regulate signal power to prevent the power unit from being overloaded.

In accordance with another embodiment, a method for protecting a power unit on a spacecraft may include estimating, by a ground station, a power loading level on a power unit of a spacecraft. The method may also include regulating a power of a signal for transmission from the ground station to the spacecraft to prevent overloading the power unit of the spacecraft. The power of the signal for transmission to the spacecraft may be regulated based at least in part on an estimated power loading level on the power unit of the spacecraft.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DESCRIPTION

The following detailed description of embodiments refers to the accompanying drawings, which illustrate specific embodiments of the disclosure. Other embodiments having different structures and operations do not depart from the scope of the present disclosure.

As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The programming may also be combined with the hardware description language (HDL) on field-programmable gate array (FPGA) circuits. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
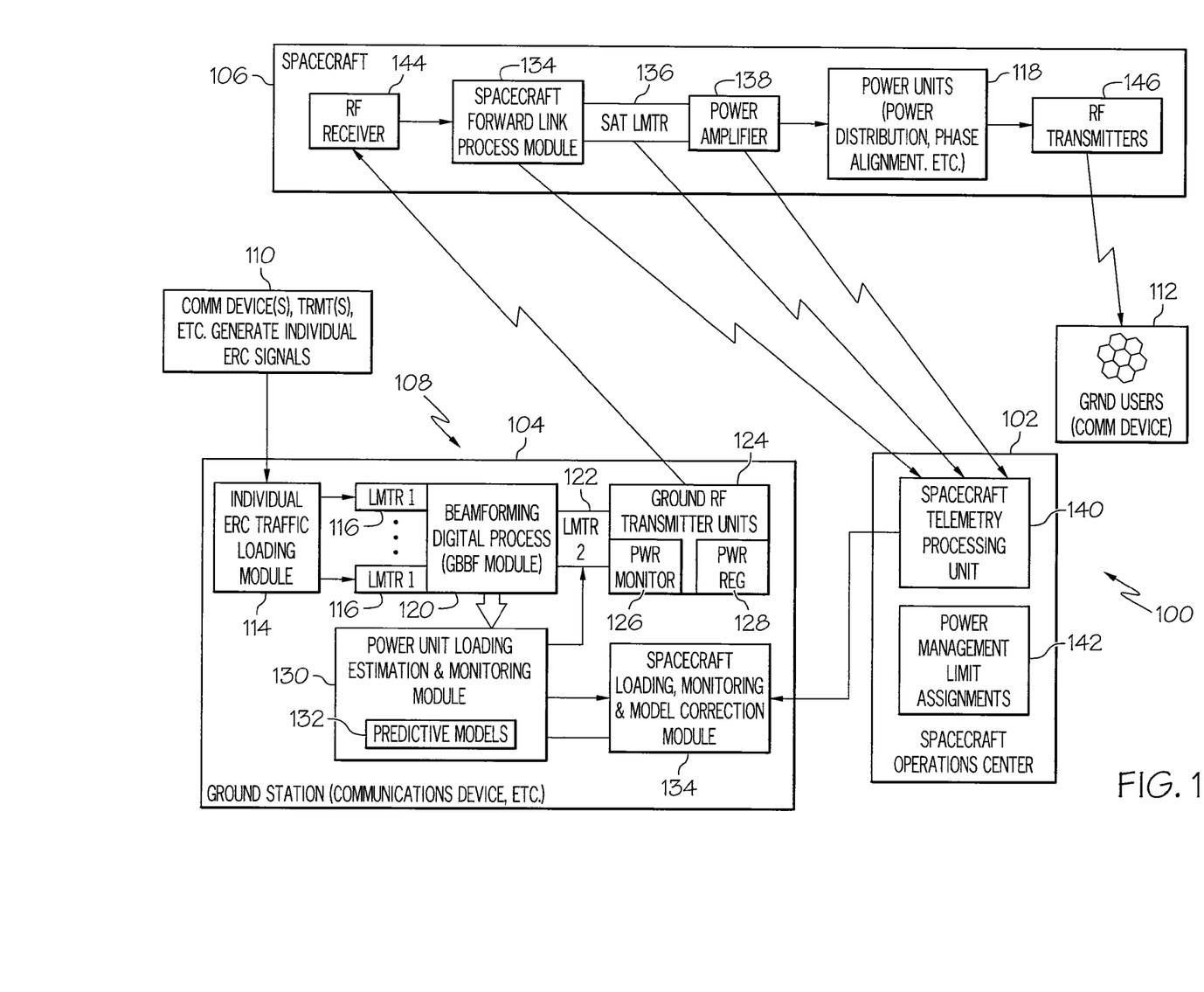
FIG. 1 is a block schematic diagram of an example of a system for protecting a power unit on a spacecraft in accordance with an embodiment of the present disclosure.

FIG. 1 is a block schematic diagram of an example system 100 for protecting a power unit of a spacecraft. The system may include a satellite operations center 102, a ground communications station 104, a spacecraft 106 and a spacecraft power unit protection scheme 108 in accordance with an embodiment of the present disclosure.

The ground station 104 may receive communications signals from a communications device 110 of a user or from multiple users' communications devices. The ground station 104 may forward the communications signals from a user or users to the spacecraft 106 so that the communications signals can be formed into beams or earth reference cells (ERCs) for transmission to specific communications devices of other individual ground users 112 associated with each ERC.

The ground station 104 may include an individual earth reference cell (ERC) traffic loading module 114 to receive the communications signals from the user communications devices 110. The signal power of each signal to be transmitted to each ERC may be regulated by a first limiter 116 or regulator. The first limiter 116 may limit or regulate the power level of signals to be transmitted to each ERC to a predetermined power level. The predetermined level may be determined based on system integration test data, in-orbit-test data or based on other criteria. The first limiter 116 may ensure that the signal power at each of the power units 118 of the spacecraft 106 is not overloaded or the power units 118 operational limits or capacity is not exceeded under normal operating conditions.

The ground station 104 may also include a ground based beamforming digital process module 120 (GBBF module). The communications signals regulated by the first limiters 116 may be received by the GBBF module 120. The GBBF module 120 may transform the communications signals into a format to permit the spacecraft 106 to transmit the signals in the specific ERCs. An example of a GBBF process that may be used in the GBBF module 120 is described in U.S. Pat. No. 7,728,766, entitled "Optimized Beamforming for Satellite Communication," issued Jun. 1, 2010, to Alexandr Draganov et al.

A second limiter 122 may regulate the power of the output signal or signals from the GBBF module 120 to prevent overloading or exceeding the capacity of the power units of the spacecraft 106. The second limiter 122 may regulate or limit the power of the output signal from GBBF module 120 in the event the GBBF process encounters any abnormal condition. As described in more detail the second limiter 122 may be controlled by a monitoring process. The monitoring process may monitor or measure the signal power level at predetermined locations in the communications system of the spacecraft 106. In the event an abnormality is detected or a signal power measurement exceeds a predetermined level which may cause the power unit 118 of the spacecraft 106 to be overdriven or to exceed its limits, the second limiter 122 may reduce the power level output from the ground station 104 or may totally shut down the transmitted power.

The ground station 104 may also include a ground radio frequency (RF) transmitter unit 124 or units to transmit the communications signals for each ERC to the spacecraft 106. The RF transmitter unit 124 may provide signal up conversion, power amplification, power transmission and other RF operations that may be needed to effectively transmit the communications signals to the spacecraft 106.

The RF transmitter unit 124 may also include a power monitor 126 and a power regulator 128. The power monitor 126 may measure the output power at a transmitter of the ground station 104. The power regulator 128 may regulate the output power of the transmitted signals based on the measured output power to further provide control of the signal power at the power units 118 of the spacecraft 106 to prevent overloading of the power units 118.

The ground station 104 may also include a power unit loading estimation and monitoring module 130. The power unit loading estimation and monitoring module 130 may estimate an output power loading level of the power units 118 of the spacecraft 106. The module 130 may then control the second limiter 122 to adjust the gain or level of the communications signals passed to the ground RF transmitter unit 124. The power units 118 are used to redistribute their output power level. The units 118 may be controlled or adjusted to provide a balance to the power amplifier loading provided by the power amplifier or amplifiers 138. The output power from units 118 may be largely imbalanced using phase alignment techniques. Because of the use of units 118, the high power units provided in the transmitters 146 may be over loaded, even if all devices from the GBBF module 120 to the power amplifier 138 are not fully loaded.

The power unit loading estimation and monitoring module 130 may include a predictive or prediction model 132 or models to predict the output power loading levels of the power units 118 of the spacecraft 106. The prediction or estimation process may use signal power measurement data from the spacecraft 106 to estimate or predict the output power loading of the power units 118. If the estimate or prediction of the loading exceeds the predetermined limit of the power units 118 the module 130 can issue a command to reduce the power limit or gain provided by the second limiter 122 to reduce the output power of the communications signals transmitted from the ground station 104 to spacecraft 106. Based on the predictive model 132, the ground traffic loading may be dynamically allocated to distribute the power between the power units 118 of the spacecraft 106 so as to not overload any one power unit 118. An example of dynamically allocating the ground traffic loading to distribute power between the power units 118 of the spacecraft 106 will be described with reference to FIG. 3.

The predictive model 132 or models may be formed at a spacecraft beginning of life (BOL) based on system integration test data. The predictive model 132 or models may also be verified and refined based on in-orbit-test (IOT) data. During the spacecraft manufacturing test, the parameters needed to build the space segment portion of the prediction or predictive model 132 can be measured to validate the mathematic model including the RF receiver 144 through the RF transmitters 146. The ground segment portion of the prediction model 132 can be measured and validated during the ground segment manufacturing and test. The integrated predictive model, which include the transmission channel between the ground transmitter units 124 to the RF receiver 144 are to be measured during IOT. However, the measurements on the spacecraft 106 are limited based on the sensors and computation data placed at certain measurement points. The measured data are to be transferred from the spacecraft 106 to refine the model provided in module 134 via telemetry data, which are available via spacecraft operations center 102.

The ground station 104 may also include a spacecraft loading, monitoring and model correction module 134. The spacecraft loading, monitoring and model correction module 134 may compare the estimated power level with the measured power level from the spacecraft 106. The estimated power level may be compared to the measured power level measured or monitored at predetermined locations within the communications system of the spacecraft 106. For example, power measurements may be taken or measured at a spacecraft forward link process module 134, a spacecraft or satellite limiter 136, a spacecraft power amplifier 138 or other predetermined locations. The comparison process in the module 134 may be a non-real-time comparison or a comparison with considerable time delay. The time delay may be expected since the data collection and transmission from the spacecraft 106 to the ground is needed. The other signal processes described with respect to the components of the ground station 104 may be real-time processes.

The system 100 may also include a spacecraft operations center 102 as previously described. The spacecraft operations center 102 may include a spacecraft telemetry processing unit 140. The spacecraft telemetry processing unit 140 may receive the power measurement data from the spacecraft 106. As previously described power measurement data may be received from a spacecraft forward link process module 134, a spacecraft limiter 136, a spacecraft power amplifier 138 as well as other possible locations. The power measurement data may be transmitted to the spacecraft loading, monitoring and model correction module 134 for comparison with the estimated or predicted power levels of the spacecraft 106 from module 132.

The spacecraft operations center 102 may also include a power management limit assignments module 142. The power management limit assignments module 142 may determine power limits for the first limiter 116, the second limiter 122, the spacecraft limiter 136 and the ground RF transmitter units 124. The signal power through these units may then be regulated or adjusted based on the power management limit assignments from the module 142. The signal power through the second limiter 122 may be adjusted based on the predictive models 132 in the power unit loading estimation and monitoring module 130 similar to that previously described.

The spacecraft 106 may include a RF receiver 144 for receiving the communications signals from the ground station 104. From the RF receiver 144 the communications signals may be passed to the spacecraft forward link process module 134. The spacecraft forward link process module 134 may process the communications signals and allocate the signals to different power amplifiers 138. The communications signals allocated by the module 134 may be regulated or adjusted by the spacecraft or satellite limiter 136. The communications signals may be regulated or adjusted by the limiter 136 based on the power management limit assignment from the module 142 of the spacecraft operations center 102 or based on some other preset limit or criterion.

The power amplifiers 138 may amplify the communications signals as may be needed for forming the beams for the ERCs. The communications signals from the power amplifiers 138 are passed to the power units 118. The power units 118 may each perform a predetermined function or functions to make the communications signals compatible for transmitting the signals in the ERCs to the specific ground users 112 associated with each ERC. The functionality of the power units 118 may differ depending upon the design of the spacecraft communications system. Examples of possible functionalities may include signal redistribution and signal phase alignment for generating the desired ERCs. An RF transmitter or transmitters 146 may then transmit the communications signals divided in the ERCs to the intended ground users 112 associated with each ERC or beam.

Figure 2A:
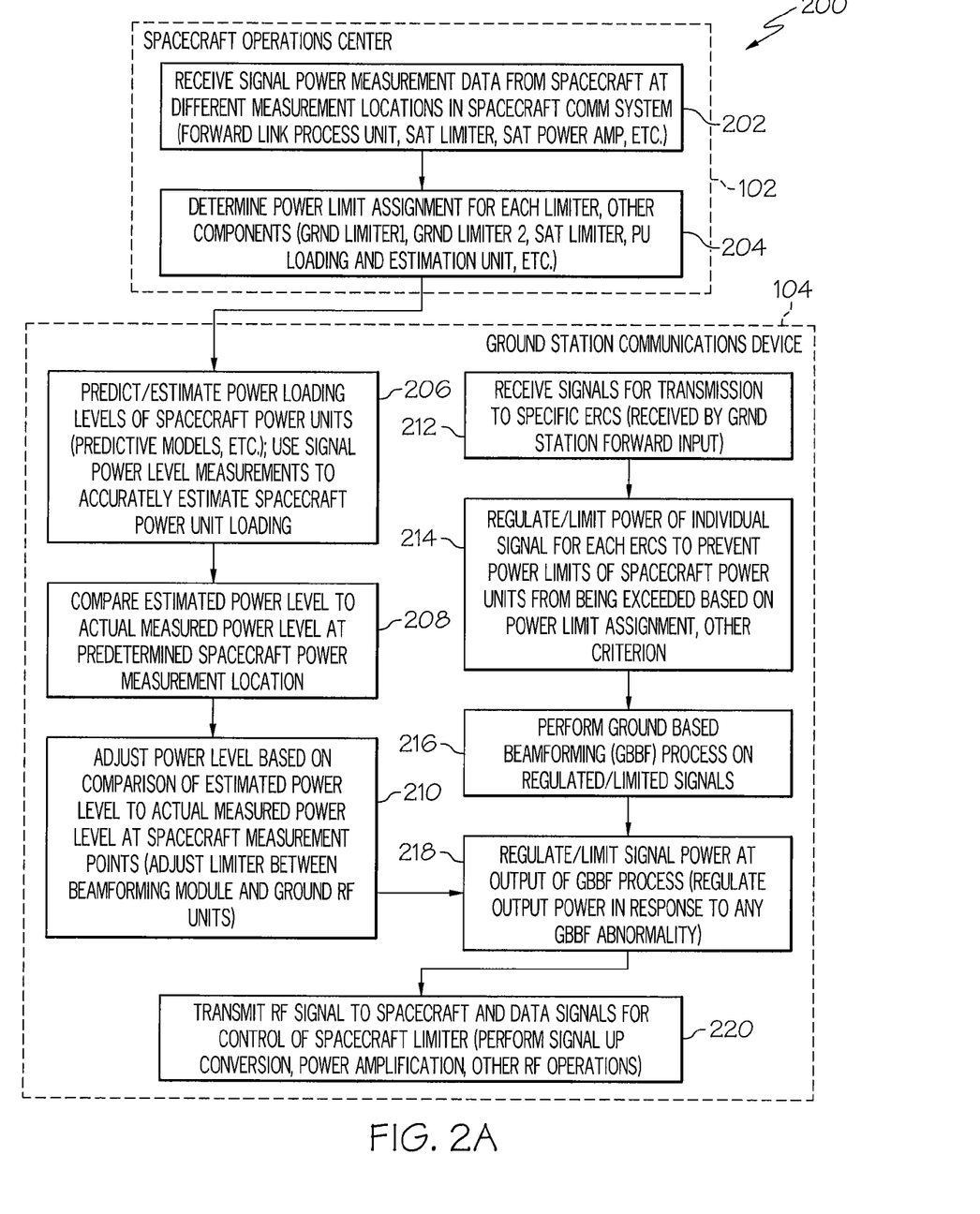
FIGS. 2A and 2B are a flow chart of an example of a method for protecting a power unit of a spacecraft in accordance with an embodiment of the present disclosure.
Figure 2B:
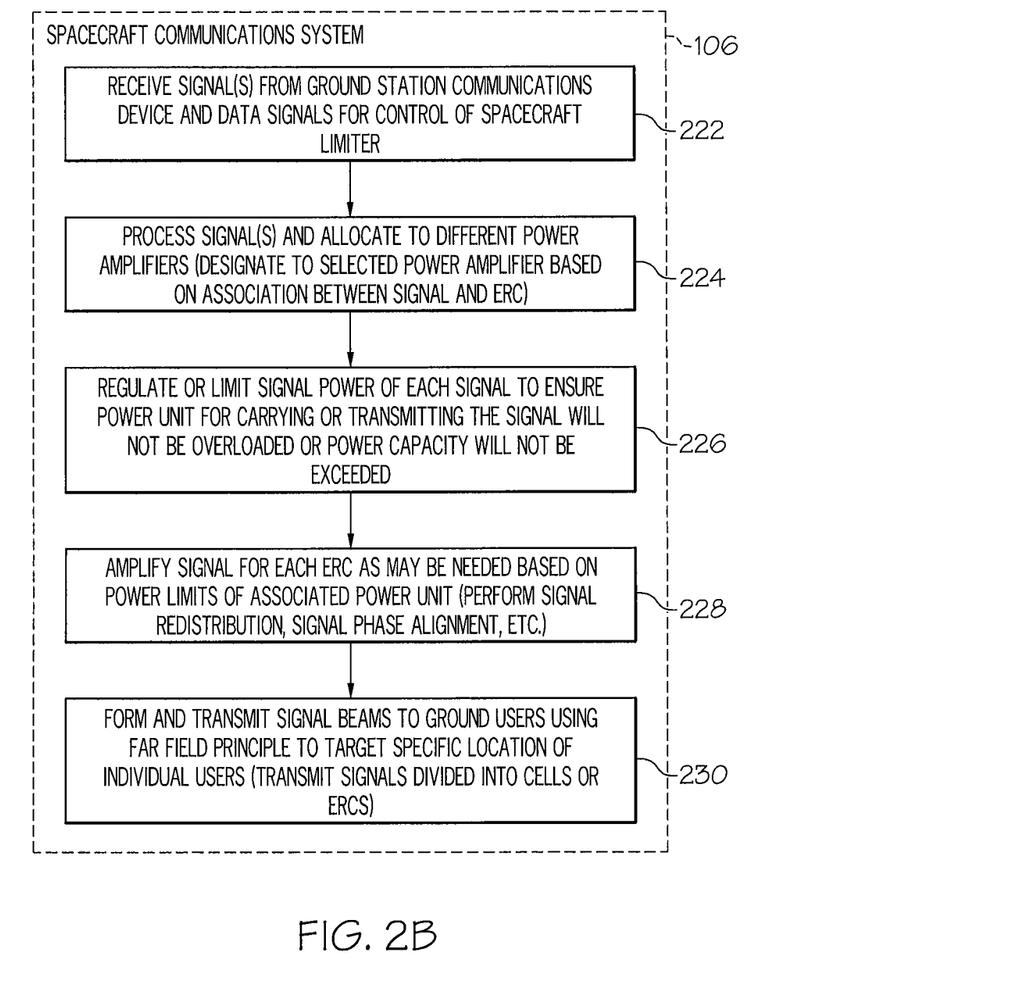

FIGS. 2A and 2B are a flow chart of an example of a method 200 for protecting a power unit of a satellite in accordance with an embodiment of the present disclosure. The method 200 may be performed by or embodied in the system 100 of FIG. 1. The functions that may be performed by the different components of the system 100 are illustrated by the boxes in broken lines and FIGS. 2A and 2B. The present disclosure is not intended to be limited by the functions or operations indicated in FIGS. 2A and 2B as being performed by any particular component.

In block 202, signal power measurement data may be received from the spacecraft. The signal power measurement data may be measured at different measurement locations in the spacecraft communications system. For example, similar to that previously described power measurements may be performed at the forward link process unit or module 134 in FIG. 1, at the satellite or spacecraft limiter 136, at the satellite power amplifiers 138 or other locations within the spacecraft communications system.

In block 204, a power limit assignment for each limiter or other component in the spacecraft power protection scheme or system may be determined. The exemplary functions or operations performed by block 202 and 204 may be performed by a spacecraft operations center similar to spacecraft operations center 102 in FIG. 1 or may be performed by some other component in the system.

In block 206, a power loading level of the spacecraft power units may be predicted or estimated. Similar to that previously described a predictive model or models may be used to predict or estimate the power loading levels of the spacecraft power units. Signal power level measurements from the predetermined power measurement locations in the spacecraft communications system may also be used to accurately estimate the spacecraft power unit loading.

In block 208, the estimated or predicted power level may be compared to the actual measured power level at the predetermined spacecraft power measurement locations.

In block 210, the power level of the communications signals to be transmitted to the spacecraft may be adjusted based on comparison of the estimated power level to the actual measured power level. Similar that previously described the limiter 122 between the beamforming module 120 and the ground RF transmitter units 124 may adjust the power level of the signals to prevent any overloading of the power units of the spacecraft.

The ground traffic loading may also be dynamically allocated to distribute the power between the power units of the spacecraft so as to not overload any one power unit based on the predictive models or comparison of the estimated and measured power levels. An example of dynamically allocation to distribute the power between the power units to prevent an overload of any one power unit will be described with reference to FIG. 3.

In block 212, communications signals may be received for transmission to specific ERCs. The communications signals may be received by a forward input of a ground station.

In block 214, a signal power of each individual communications signal may be regulated or limited for each ERC to prevent any overload of the power units of the spacecraft or the power limits of the spacecraft power units from being exceeded.

In block 216, the ground-based beamforming (GBBF) process may be performed on the regulated or limited communications signals. In block 218, the signal power at the output of the GBBF process may be regulated based on the comparison of the estimated or predicted power levels to the measured power levels from the spacecraft. The output power of the GBBF process may be regulated in response to any abnormality of the GBBF process.

In block 220 the RF signal or signals for the ERCs may be transmitted to the spacecraft along with any data signals for controlling any spacecraft limiters. Any signal up conversion, power amplification or other RF operations may be performed in block 220.

While the functions and operations in blocks 206-220 are illustrated in FIG. 2A as being performed by a ground station communications device, this is not intended to limit the present disclosure in any way.

Referring now to FIG. 2B, in block 222 a communication signal or signals and any data signals for controlling any spacecraft limiters may be received from the ground station communications device.

In block 224, the signal or signals may be processed and allocated to different power amplifiers. The signals may be designated to selected power amplifiers based on particular signals being associated with certain ERCs.

In block 226, the signal power of each signal may be regulated or limited to ensure that the power unit for carrying or transmitting the signal will not be overloaded or the power capacity of the power unit will not be exceeded.

In block 228 the signal for each ERC may be amplify as may be needed based on the power limits of the associated power unit. The power unit may perform signal redistribution signal phase alignment or other functions as may be needed based on the design of the spacecraft communications system.

In block 230, signal beams or ERCs may be formed and transmitted to ground users. The signal beams or ERCs may be formed using a far field principle to target specific locations of individual users.

Figure 3:
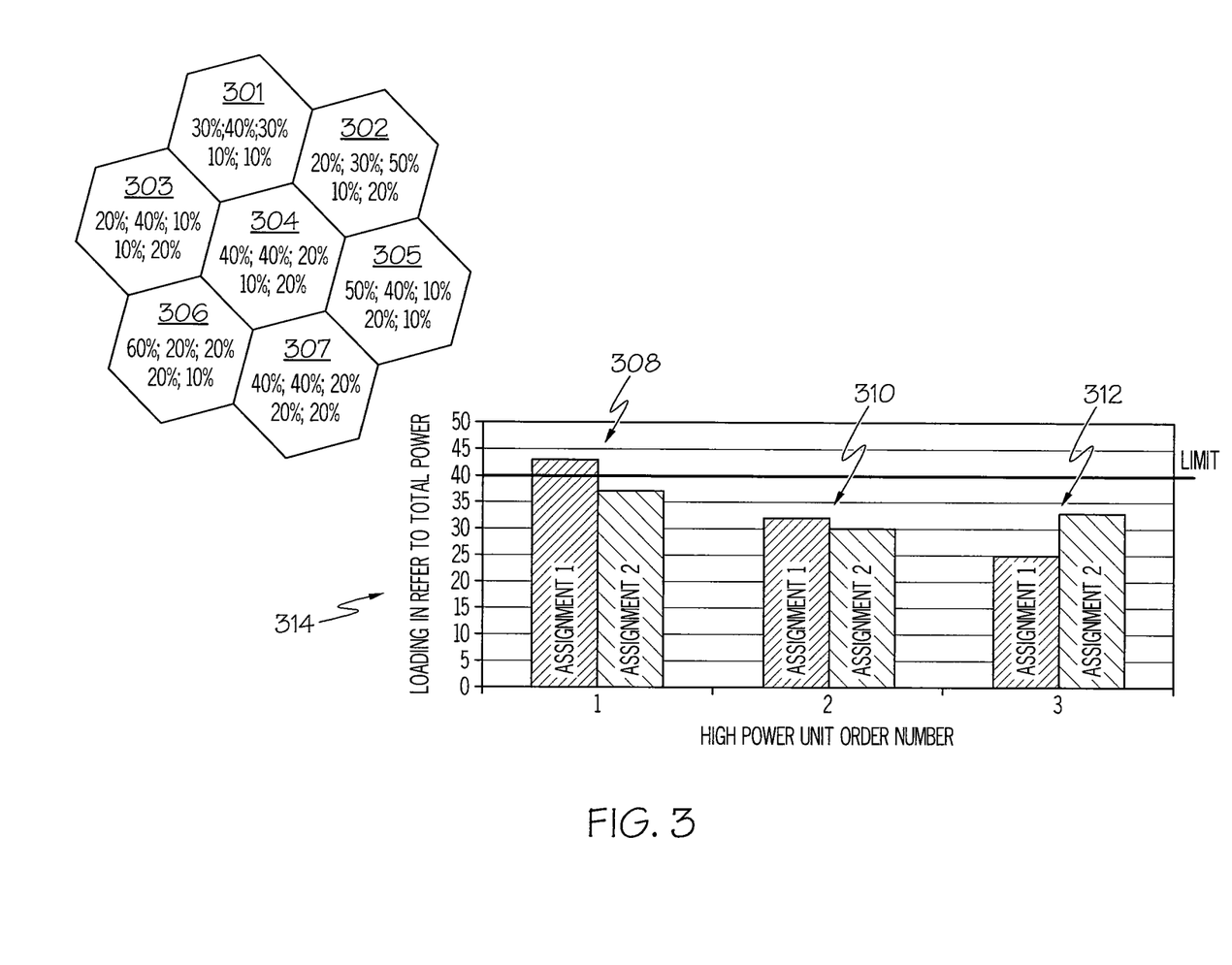
FIG. 3 is an example of earth reference cell (ERC) power allocation based on power unit loading in accordance with an embodiment of the present disclosure.

FIG. 3 is an example of ERC power allocation based on power unit loading in accordance with an embodiment of the present disclosure. Seven cells or ERC's 301-307 are illustrated in FIG. 3. The example also assumes that the spacecraft communications system has three power units as illustrated by the power unit assignments 308, 310 and 312 in the bar chart 314. The first row in each cell 301-307 corresponds to the cell order number. The second row in each cell 301-307 corresponds to the power unit contribution to the current ERC. The sum of all three power unit contributions in each cell equals 100%. The third row in each cell corresponds to the power assignment. The first percentage in the third row in each cell 301-307 corresponds to power assignment 1 in the bar graph 314 and the second percentage in the third row of each cell 301-307 corresponds to power assignment 2 in the bar graph 314. As illustrated in the bar graph 314, the power assignment 1 causes power unit 1 to exceed its power limit. The power allocation can be reallocated such as that illustrated by assignment 2 in which all three power units are within their power limits as illustrated in the bar chart 314. The power allocation can be a static assignment or a dynamic assignment depending upon the system requirements. Only seven cells are illustrated in the FIG. 3 to illustrate the working principle. An actually system may contain hundreds or thousands of cells. The computation may be more complicated. The working principle can be applied to any number of cells.

As described above, a systematic scheme, system and method to prevent the high power units in a communication spacecraft from over driven is disclosed. The scheme described includes multiple regulation points and multiple monitoring points. The monitoring points may use a predictive model to estimate the loading of the high power units on the spacecraft. If a monitoring point detects a high power unit being overloaded, actions may be taken to reduce the transmission power to effectively protect the high power units of the spacecraft. The power protection mechanism disclosed herein is especially beneficial to a satellite communication system using the ground based beam forming technique. The power management scheme is a systematic method to provide protection to hardware units. The scheme can be used in conjunction with other existing hardware power limiting methods or devices to limit the instantaneous max power level.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A system for protecting a power unit on a spacecraft, comprising:
 a ground station, the ground station comprising:
  a power unit loading estimation and monitoring module for estimating a power loading level on a power unit of a spacecraft; and
  a ground station power limiter to regulate a power of a signal for transmission from the ground station to the spacecraft to prevent overloading the power unit of the spacecraft, wherein the power of the signal for transmission to the spacecraft is regulated based at least in part on an estimated power loading level on the power unit of the spacecraft.

2. The system of claim 1, further comprising a spacecraft power limiter on board the spacecraft to regulate signal power to prevent the power unit of the spacecraft from being overloaded.

3. The system of claim 1, further comprising another ground station power limiter to regulate a power of a transmitted signal to each earth reference cell.

4. The system of claim 1, further comprising:
 a spacecraft power limiter on board the spacecraft to regulate signal power to prevent the power unit of the spacecraft from being overloaded; and
 another ground station power limiter to regulate a power of a transmitted signal to each earth reference cell.

5. The system of claim 4, further comprising a power management limit assignments module to determine a limit for each of the ground station power limiters and the spacecraft power limiter.

6. The system of claim 1, wherein the power unit loading estimation and monitoring module comprises a predictive model to predict the loading level on the power unit of the spacecraft, the predictive model using a measured signal power level from the spacecraft to accurately estimate the loading level on the power unit of the spacecraft.

7. The system of claim 6, wherein the power unit loading estimation and monitoring module issues a command to reduce a power limit provided by the ground station power limiter to reduce the signal power transmitted by the ground station to the spacecraft in response to the estimated loading level on the power unit of the spacecraft exceeding a predetermined limit.

8. The system of claim 6, wherein the predictive model is formed at a spacecraft beginning of life based on system integration test data and based on in-orbit-test data.

9. The system of claim 6, wherein the predictive model is updated during normal operation based on measurement data from the spacecraft and comparing estimated power data to measured power data from the spacecraft.

10. The system of claim 1, wherein the earth station further comprises:
an individual earth reference cell traffic loading module to receive one or more transmission signals, each signal to be sent to a specific earth reference cell;
another ground station power limiter for each received transmission signal to regulate the power of the transmission signal to each specific earth reference cell; and
a ground based beamforming module to receive the transmission signal from each of the other ground station power limiters.

11. The system of claim 1, further comprising a spacecraft loading, monitoring and model correction module to compare an estimated power level at a predetermined spacecraft power measurement location with a measured power level at the predetermined spacecraft power measurement location.

12. A spacecraft, comprising:
a spacecraft forward link process module to allocate signals received from a ground station transmitter to different power amplifiers on board the spacecraft;
a power unit for performing selected functions before transmitting signals to ground users; and
a spacecraft power limiter on board the spacecraft to regulate signal power to prevent the power unit from being overloaded and wherein a power of the signals received from the ground station are regulated based at least in part on an estimated power loading level on the power unit of the spacecraft.

13. The spacecraft of claim 12, further comprising a power unit for each earth reference cell, wherein the spacecraft power limiter regulates the signal power to each power unit based on a predetermined power limit.

14. A method for protecting a power unit on a spacecraft, comprising:
estimating, by a ground station, a power loading level on a power unit of a spacecraft; and
regulating a power of a signal for transmission from the ground station to the spacecraft to prevent overloading the power unit of the spacecraft, wherein the power of the signal for transmission to the spacecraft is regulated based at least in part on an estimated power loading level on the power unit of the spacecraft.

15. The method of claim 14, further comprising regulating a power of each individual signal for each earth reference cell received by an individual earth reference cell traffic loading module in a ground station.

16. The method of claim 14, further comprising using a predictive model to predict the loading level on the power unit of the spacecraft, the predictive model using a measured signal power level from the spacecraft to estimate the loading level on the power unit of the spacecraft.

17. The method of claim 16, further comprising updating the predictive model during normal operation based on measurement data from the spacecraft and comparing the estimated power data to the measured power data from the spacecraft.

18. The method of claim 14, further comprising:
receiving signal power measurement data from the spacecraft at different predetermined power measurement locations in a communications system of the spacecraft;
comparing estimated power levels to signal power measurement data from the spacecraft at the different predetermined power measurement locations; and
adjusting power level based on comparison of the estimated power level to the signal power measurement data from the spacecraft.

19. The method of claim 14, further comprising:
performing a ground based beamforming process;
regulating a signal power at an output of the ground based beamforming process based on an estimated power loading level on the power unit of the spacecraft.

20. The method of claim 14, further comprising:
regulating a power of each individual signal for each earth reference cell received by an individual earth reference cell traffic loading module in a ground station;
performing a ground based beamforming process on the regulated signal for each earth reference cell; and
regulating a signal power at an output of the ground based beamforming process based on an estimated power loading level on the power unit of the spacecraft.

* * * * *